United States Patent
Thomas et al.

(10) Patent No.: US 10,443,572 B2
(45) Date of Patent: Oct. 15, 2019

(54) SYSTEM AND METHOD FOR REMOVING OR INSTALLING A MAIN SHAFT OF A WIND TURBINE

(71) Applicant: General Electric Company, Schenectady, NY (US)

(72) Inventors: Gregory Clarence Thomas, Saratoga Springs, NY (US); Richard Arland Ohl, Jr., Hudson, NY (US); Jonathan Paul Signore, Latham, NY (US); Charles Wade Trojcak, Abilene, TX (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 15/007,478

(22) Filed: Jan. 27, 2016

(65) Prior Publication Data
US 2017/0211547 A1    Jul. 27, 2017

(51) Int. Cl.
*F03D 80/50* (2016.01)
*F03D 13/10* (2016.01)

(52) U.S. Cl.
CPC ............. *F03D 13/10* (2016.05); *F03D 80/50* (2016.05); *F05B 2230/60* (2013.01);
(Continued)

(58) Field of Classification Search
CPC ...... F03D 13/10; F03D 80/50; F05B 2240/61; F05B 2230/60; F05B 2230/61; F05B 2230/70; F05D 2230/60; F05D 2230/70
See application file for complete search history.

(56) References Cited

U.S. PATENT DOCUMENTS 3,043,452 A  *  7/1962  Spillios .................... B65G 1/00
                                                           108/53.1
6,149,308 A  *  11/2000  Schroeder ............. F16C 29/005
                                                              384/50
(Continued)

FOREIGN PATENT DOCUMENTS

DE      299 24 115 U1      2/2002
DE    10 2010 016840 A1   11/2011
(Continued)

OTHER PUBLICATIONS

Extended European Search Report and Opinion issued in connection with corresponding EP Application No. 17156986.6 dated Aug. 25, 2017.

*Primary Examiner* — Jacob J Cigna
*Assistant Examiner* — Lee A Holly
(74) *Attorney, Agent, or Firm* — Dority & Manning, P.A.

(57) ABSTRACT

The present disclosure is directed to a system and method for removing or installing a main shaft of a drivetrain assembly of a wind turbine to and from a nacelle installed atop a wind turbine tower. The rail system includes at least one support component configured to support the main shaft. Further, the support component is configured horizontally with respect to the main shaft. The rail system also includes at least one sliding component connected between the support component and the main shaft. Thus, the sliding component is configured to move horizontally with respect to the support component so as to slide the main shaft between an installed position and an uninstalled position.

9 Claims, 9 Drawing Sheets

(52) U.S. Cl.
CPC ....... *F05B 2230/61* (2013.01); *F05B 2230/70* (2013.01); *F05B 2240/61* (2013.01); *Y02E 10/726* (2013.01); *Y02P 70/523* (2015.11)

(56) References Cited

U.S. PATENT DOCUMENTS

| | | | |
|---|---|---|---|
| 8,287,421 B2* | 10/2012 | Ciszak | F16H 37/0833 |
| | | | 475/331 |
| 2007/0200103 A1* | 8/2007 | Viladomiu i Guarro | |
| | | | B66C 23/207 |
| | | | 254/334 |
| 2011/0110769 A1* | 5/2011 | Stiesdal | F16C 35/062 |
| | | | 415/170.1 |
| 2012/0125876 A1* | 5/2012 | Park | F03D 80/50 |
| | | | 212/312 |
| 2014/0334908 A1* | 11/2014 | Hansen | F03D 80/50 |
| | | | 414/749.6 |
| 2015/0316024 A1* | 11/2015 | Larsen | F03D 1/003 |
| | | | 414/564 |

FOREIGN PATENT DOCUMENTS

| | | |
|---|---|---|
| EP | 1 101 934 A2 | 5/2001 |
| EP | 1 291 521 A1 | 3/2003 |
| WO | WO2013/080392 A1 | 6/2013 |

\* cited by examiner

SYSTEM AND METHOD FOR REMOVING OR INSTALLING A MAIN SHAFT OF A WIND TURBINE

FIELD OF THE INVENTION

The present disclosure relates generally to wind turbines, and more particularly to systems and methods for removing and/or installing a main shaft to and from a nacelle located atop a wind turbine tower.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the turbine blades, which spin a low speed shaft, i.e. the main shaft. The main shaft is coupled to an input shaft of a gearbox, which has a higher speed output shaft connected to a generator. Thus, the geared drivetrain aims to increase the velocity of the mechanical motion. Further, the gearbox and the generator are typically supported by one or more bearings and mounted to the bedplate via one or more torque arms or supports.

Over time, the main shaft and associated bearings may become worn and/or damaged due to normal operating loads and forces from the wind acting on the wind turbine components. Unfortunately, repair of main shaft and the main bearings often requires the turbine head to be removed from atop the nacelle and transported to a factory, which can be very time-consuming and expensive.

Thus, the art is continuously seeking new and improved systems and methods for repairing and/or replacing a main shaft of the wind turbine. Accordingly, the present subject matter is directed to a system and method for removing and/or installing a main shaft to and from a nacelle located atop a wind turbine tower that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rail system configured to remove or install a main shaft of a drivetrain assembly of a wind turbine to and from a nacelle installed atop a wind turbine tower. The rail system includes at least one support component configured to support the main shaft. Further, the support component is configured horizontally with respect to the main shaft. The rail system also includes at least one sliding component connected between the support component and the main shaft. Thus, the sliding component is configured to move horizontally with respect to the support component so as to slide the main shaft between an installed position and an uninstalled position.

More specifically, in one embodiment, the support component(s) may be configured above the main shaft. Alternatively, in another embodiment, the support component(s) may be configured below the main shaft. In additional embodiments, the support component(s) may be configured on the sides of the main shaft. Further, in certain embodiments, the support component(s) may include parallel support arms. Thus, in particular embodiments, the rail system may include at least one sliding component configured with each of the parallel support arms such that the weight of the main shaft is evenly supported during removal and/or installation.

In another embodiment, each of the parallel support arms may include a track. More specifically, in such embodiments, each of the sliding components may include at least one rolling element configured within each track and at least one strap connected between each rolling element and the main shaft. For example, in particular embodiments, the rail system may also include a sliding component configured with a forward end of the main shaft and a sliding component configured at an aft end of the main shaft, e.g. so as to provide balanced support to main shaft.

In additional embodiments, the straps of the sliding components may be configured circumferentially around the main shaft. Alternatively, the straps may be secured to a side location of the main shaft.

In further embodiments, the parallel support arms may be further supported, e.g. by securing at least one rod component perpendicularly between the parallel support arms. In another embodiment, the rail system may include at least one structural support configured with each of the parallel support arms. In such embodiments, the structural supports may be secured to a stationary component of the wind turbine, e.g. the bedplate, via one or more fasteners.

In yet another embodiment, the rail system may include a push/pull component configured to push or pull the main shaft during removal and/or installation thereof. More specifically, in certain embodiments, the push/pull component may be configured to be mounted to a bearing housing of the main shaft.

In another aspect, the present disclosure is directed to a method for removing a main shaft of a drivetrain assembly of a wind turbine from a nacelle installed atop a wind turbine tower. The method includes mounting at least one support component within the nacelle of the wind turbine in a horizontal orientation with respect to the main shaft. The method also includes securing at least one sliding component to the support component and to the main shaft. Another step includes horizontally sliding the main shaft from within the nacelle to an outside location of the nacelle via the sliding component. Thus, the method also includes lowering the main shaft to a ground location.

More specifically, in one embodiment, the method may include lowering the main shaft to the ground location via a crane.

In another embodiment, the step of mounting the support component(s) within the nacelle in the horizontal orientation with respect to the main shaft may include securing parallel support arms above or below the main shaft. More specifically, the parallel support arms may be mounted on opposing sides of the main shaft. In addition, as mentioned, each of the parallel support arms may include a track. Thus, in such embodiments, the step of securing at least one sliding component between the support component and to the main shaft may include securing a rolling element within each of the tracks of the parallel support arms and securing a strap to each rolling element and circumferentially around the main shaft.

In another embodiment, the method may include securing at least one rod component perpendicularly between the parallel support arms, e.g. so as to provide further support to the rail system. In addition, in further embodiments, the method may include securing a structural support between each of the parallel support arms and a bedplate of the wind turbine via one or more fasteners.

In additional embodiments, the method may include mounting a push/pull component to a bearing housing of the main shaft. Thus, the push/pull component is configured to push or pull the main shaft during removal or installation thereof.

In yet another aspect, the present disclosure is directed to a method for installing a main shaft of a drivetrain assembly of a wind turbine within a nacelle installed atop a wind turbine tower. The method includes mounting parallel support arms above the main shaft within the nacelle of the wind turbine in a horizontal orientation with respect to the main shaft, wherein each of the parallel support arms has a track. Thus, the method also includes securing at least one sliding component within each of the tracks of the parallel support arms. Further, the method includes lifting the main shaft from a ground location to the nacelle installed atop the tower. The method also includes securing the main shaft to the sliding component. In addition, the method includes horizontally sliding the main shaft within the nacelle via the sliding component. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for removing and/or installing a main shaft of a drivetrain assembly of a wind turbine to and from a nacelle installed atop a wind turbine tower. The rail system generally includes parallel support arms mounted substantially horizontal to the main shaft of the drivetrain assembly. Further, the rail system also includes at least one sliding component configured with each of the support arms. More specifically, the sliding components are connected between the support arms and the main shaft and generally slid along a track of the support arms. Thus, the sliding components are configured to move horizontally with respect to the parallel support arms so as to slide the main shaft between an installed position and an uninstalled position.

The present system and method includes many advantages not present in the prior art. For example, the present disclosure allows the main shaft of the wind turbine to be easily installed and/or replaced in the field, without having to transport the shaft to a factory. Thus, the present disclosure reduces cost and logistics associated with returning the wind turbine to service due to damage and/or replacement of the main shaft.

Figure 1:
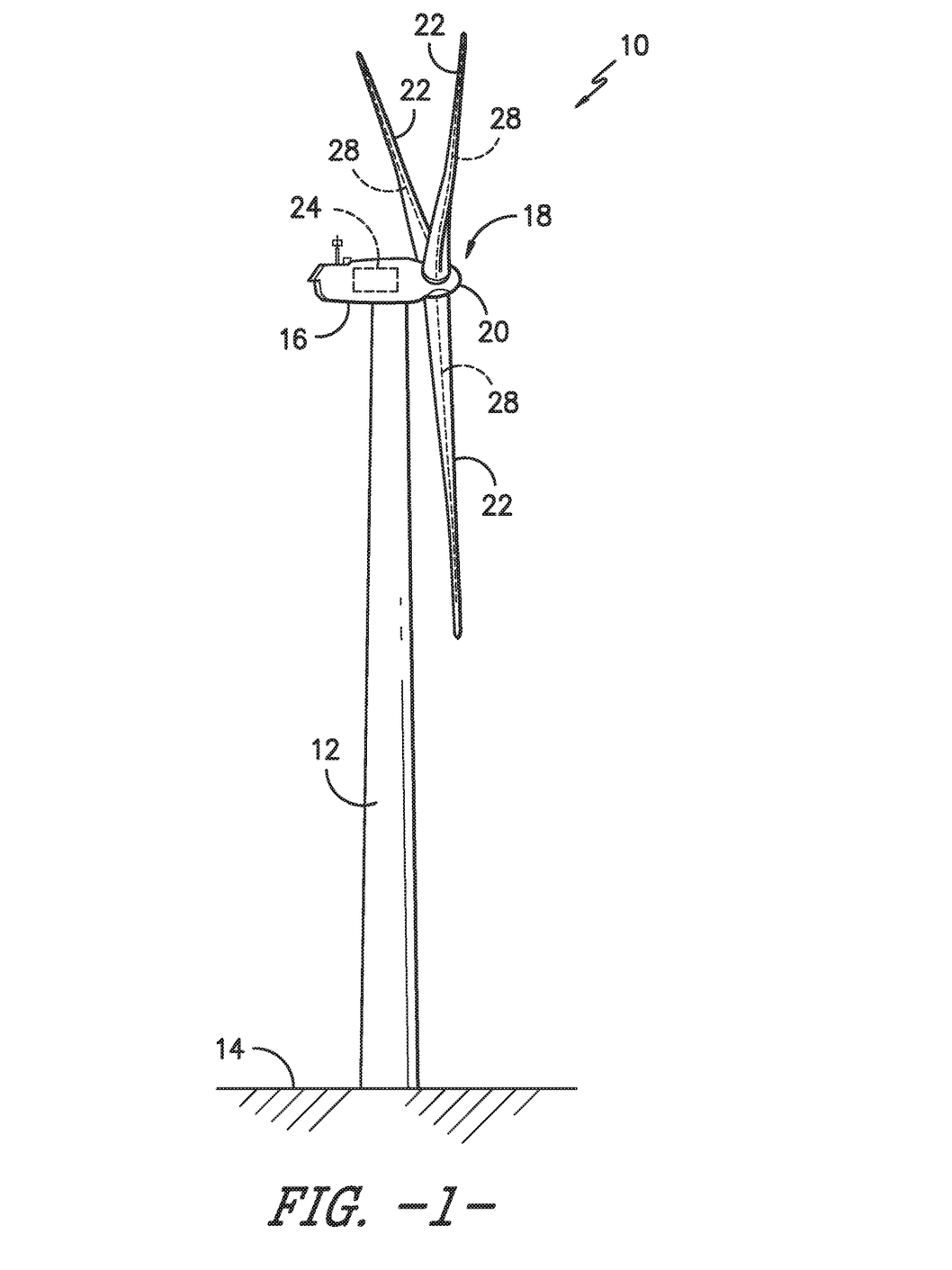
FIG. 1 illustrates a perspective view of a wind turbine according to one embodiment of the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components thereof. In addition, the controller 26 may be communicatively coupled to the rail system 60 as described herein so as to provide automatic control thereof. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals and/or performing the various method steps as described herein.

Figure 2:
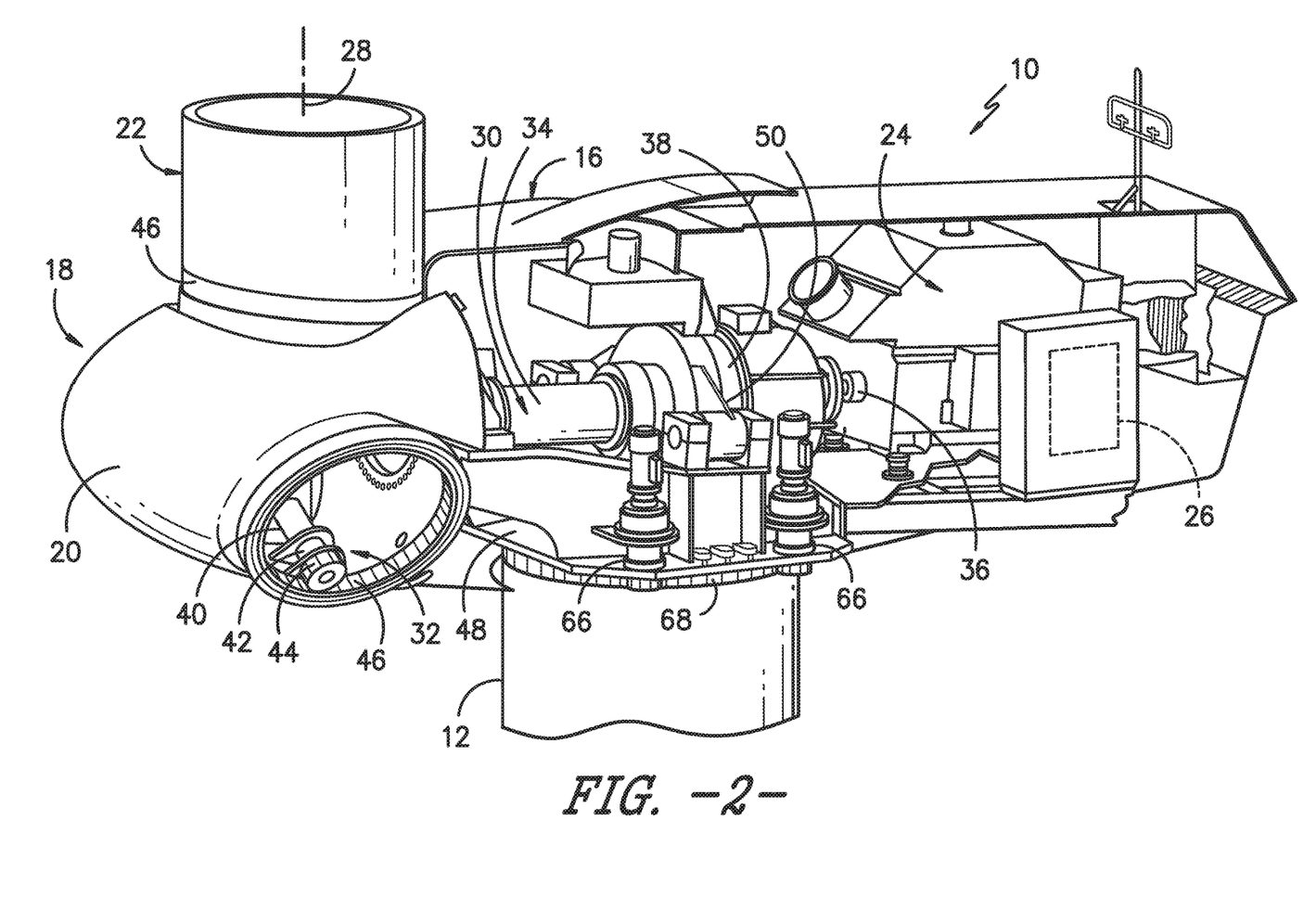
FIG. 2 illustrates a perspective view of a simplified, internal view of one embodiment of a nacelle of a wind turbine according to the present disclosure.
Figure 3:
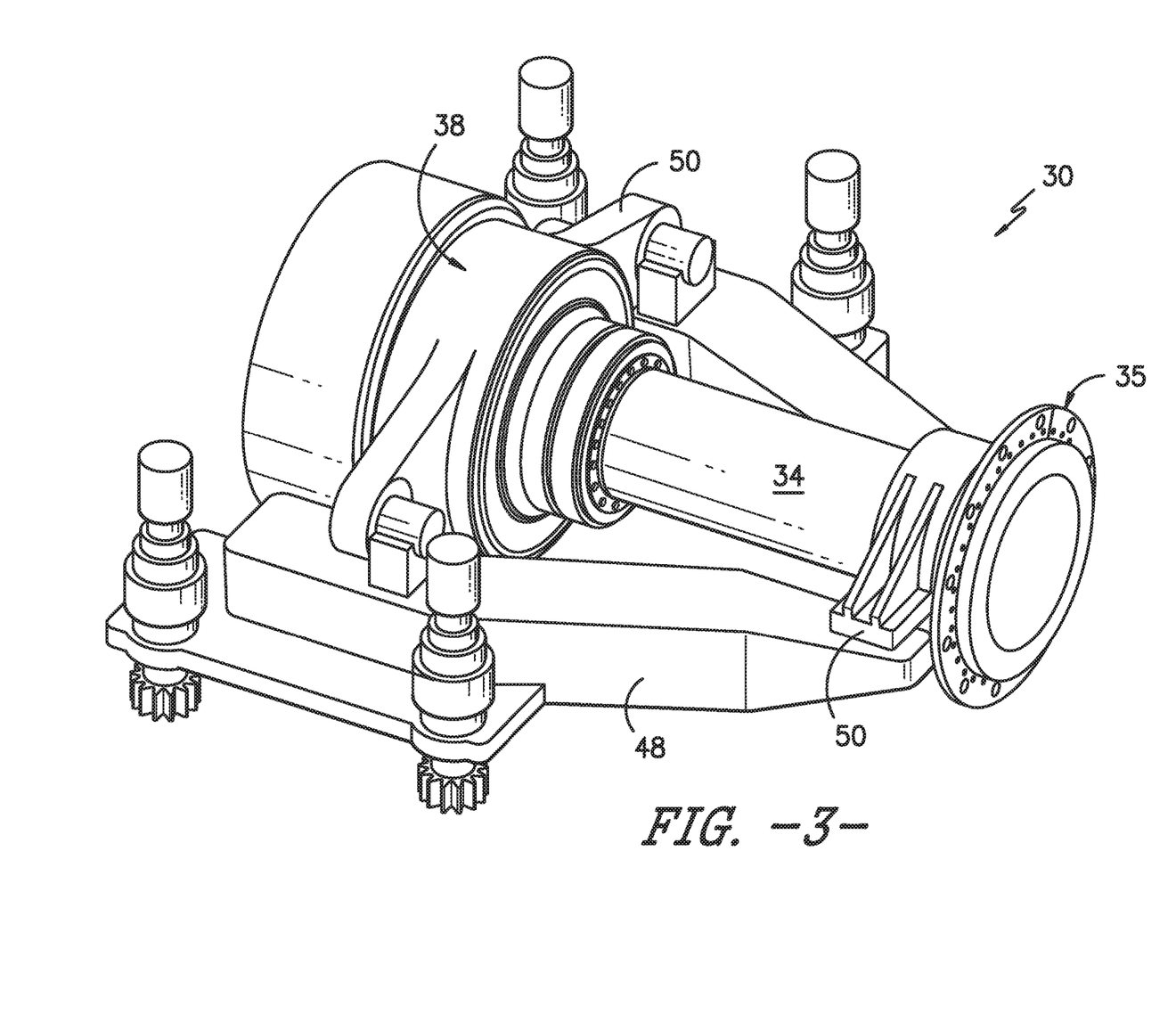
FIG. 3 illustrates a perspective view of one embodiment of a drivetrain assembly according to the present disclosure, particularly illustrating the main shaft of the drivetrain assembly.
Figure 4:
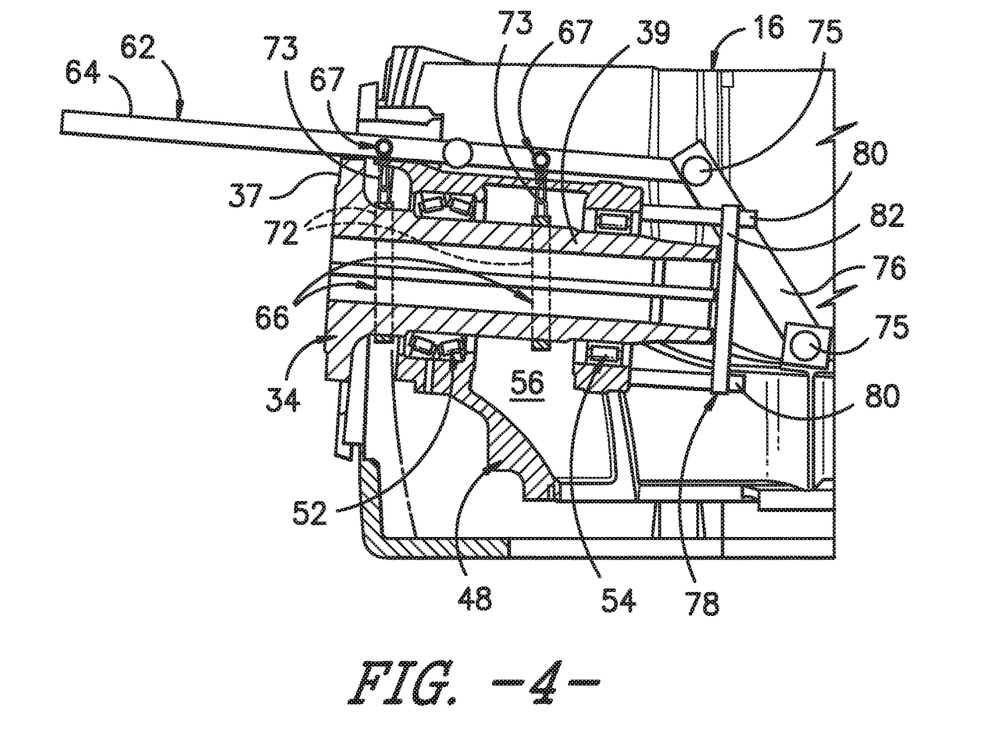
FIG. 4 illustrates a side, cross-sectional view of one embodiment of the rail system configured with the main shaft according to the present disclosure, particularly illustrating the main shaft in its installed position within the nacelle of the wind turbine.

Referring now to FIG. 2, a simplified, internal view of one embodiment of the nacelle 16 of the wind turbine 10 shown in FIG. 1 is illustrated, particularly illustrating the drivetrain assembly 30. As shown, the drivetrain assembly 30 includes the generator 24, which may be coupled to the rotor 18 for producing electrical power from the rotational energy generated by the rotor 18. For example, as shown in FIGS. 2 and 3, the rotor 18 may include a rotor or main shaft 34 coupled to the hub 20 via a main shaft flange 35 for rotation therewith. The main shaft 34 may, in turn, be rotatably coupled to a generator shaft 36 of the generator 24 through a gearbox 38 connected to a bedplate support frame 48 by a torque support 50. More specifically, as shown in FIG. 4, the main shaft 34 is typically supported by one or more bearings 52, 54. For example, as shown, a forward end 37 of the shaft 34 may be supported by a first bearing 52 and an aft end 39 of the shaft 34 may be supported by a second bearing 54. Further, as shown, the bearings 52, 54 may be mounted to the bedplate 48 of the nacelle 16 via one or more torque supports 50.

As is generally understood, the main shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Figure 6:
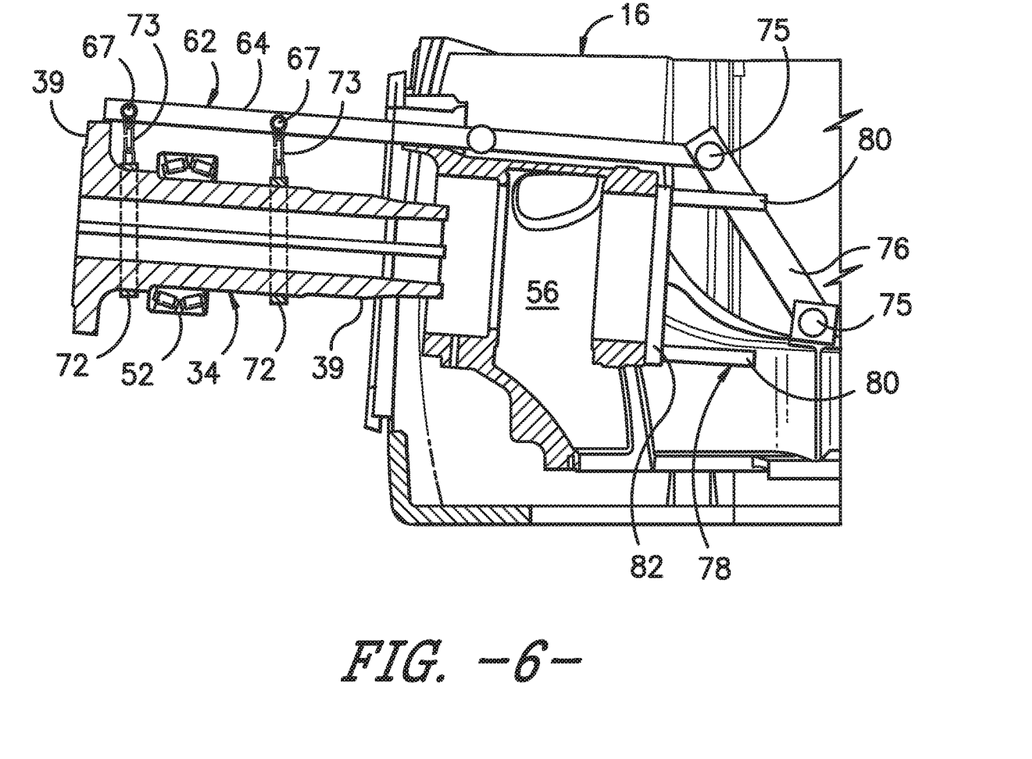
FIG. 6 illustrates a side, cross-sectional view of one embodiment of the rail system configured with the main shaft according to the present disclosure, particularly illustrating the main shaft in its uninstalled position.
Figure 7:
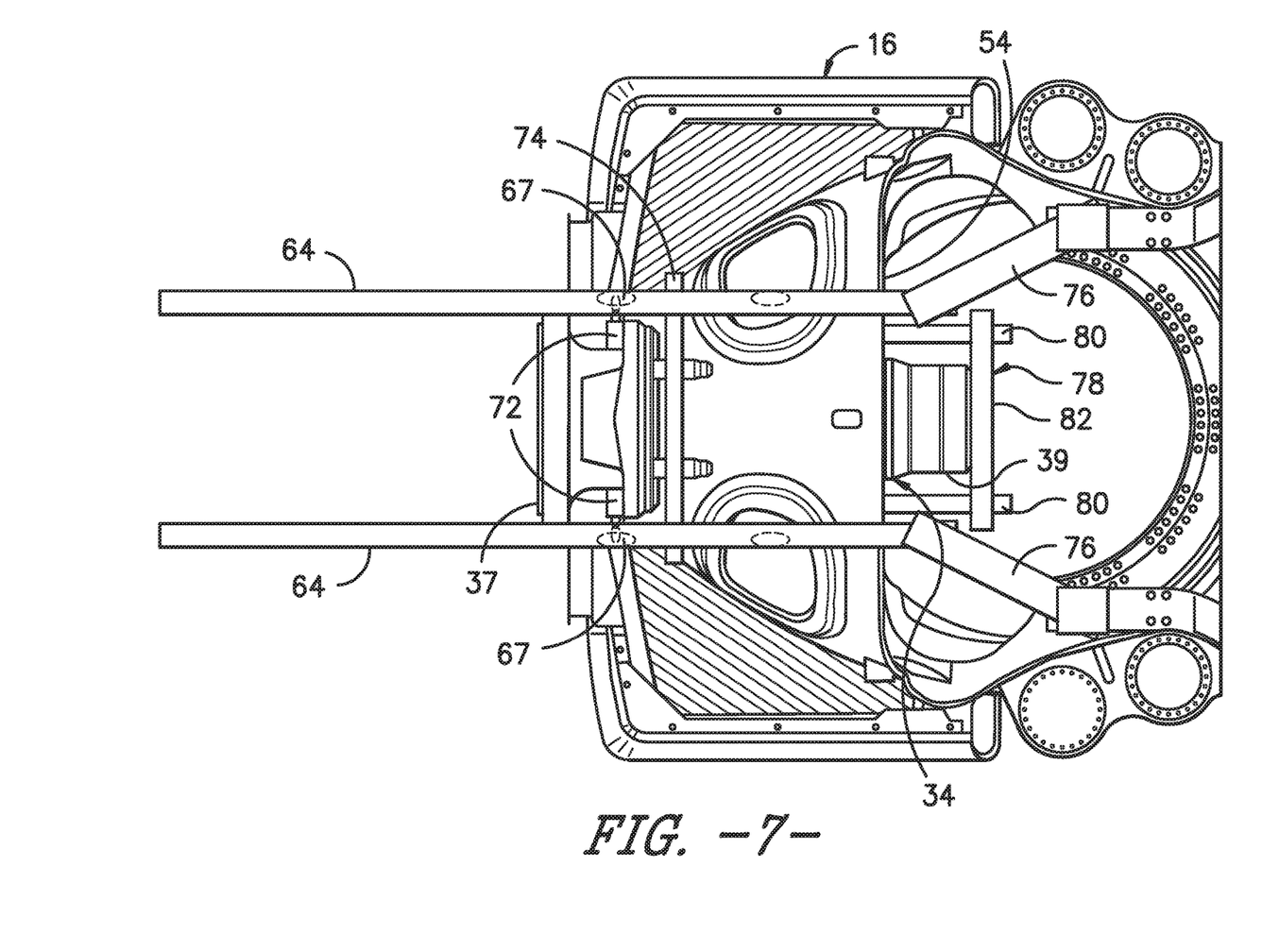
FIG. 7 illustrates a top view of one embodiment of the rail system configured with the main shaft according to the present disclosure, particularly illustrating the main shaft in its installed position within the nacelle of the wind turbine.
Figure 8:
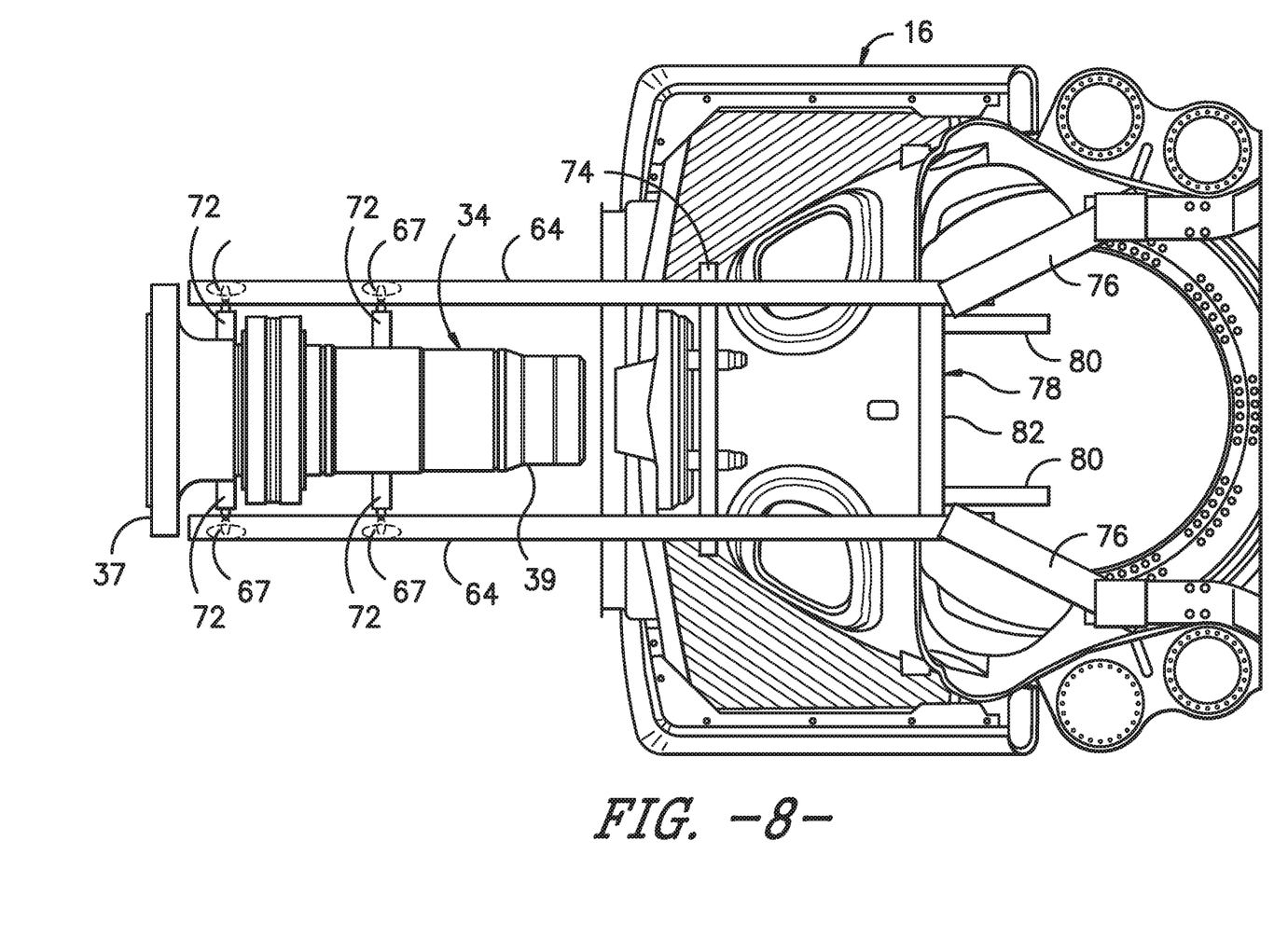
FIG. 8 illustrates a top view of one embodiment of the rail system configured with the main shaft according to the present disclosure, particularly illustrating the main shaft in its uninstalled position.

Referring now to FIGS. 4-8, various views of the rail system 60 for removing and/or installing the main shaft 34 to and from the nacelle 16 located atop the wind turbine tower 12 (FIG. 1) are illustrated. More specifically, as shown in FIGS. 4 and 6, side cross-sectional views of one embodiment of the rail system 60 configured with the main shaft 34 of the drivetrain assembly 30 according to the present disclosure are illustrated, particularly illustrating the main shaft 34 in its installed position within the nacelle 16 and in its uninstalled position, respectively. Further, FIGS. 7 and 8 illustrates top views of the main shaft 34 of the rail system 60 configured with the main shaft 34 of the drivetrain assembly 30 according to the present disclosure, particularly illustrating the main shaft 34 in its installed position within the nacelle 16 and in its uninstalled position, respectively.

More specifically, as shown generally in the figures, the rail system 60 includes at least one support component 62 configured to support the main shaft 34. For example, as shown in FIGS. 4 and 6, the support component(s) 62 may include parallel support arms 64. Further, as shown particularly in FIGS. 7 and 8, the support component(s) 62 may be configured above the main shaft 34. Alternatively, the support component(s) 62 may be configured below the main shaft 34. In addition, the support component(s) 62 may be configured on a side of the main shaft 34. Further, as shown, the support component(s) 62 may be configured horizontally with respect to the main shaft 34, e.g. so as to allow for horizontal movement of the main shaft 34.

Thus, as shown in FIGS. 4-8, the rail system 60 may also include at least one sliding component 66 configured with each of the parallel support arms 64. More specifically, as shown in FIGS. 4 and 6, the rail system 60 may include a first sliding component 66 configured with a forward end 37 of the main shaft 34 and a second sliding component 66 configured with the aft end 39 of the main shaft 34, e.g. so as to provide balanced support to main shaft 34 as the shaft 34 is being removed and/or installed. In addition, as shown, the sliding component(s) 66 may be connected between the support component(s) 62 and the main shaft 34. Thus, the sliding component(s) 66 is configured to move horizontally with respect to the support component(s) 66 so as to slide the main shaft 34 between an installed position (FIGS. 4 and 7) and an uninstalled position (FIGS. 6 and 8).

Figure 5:
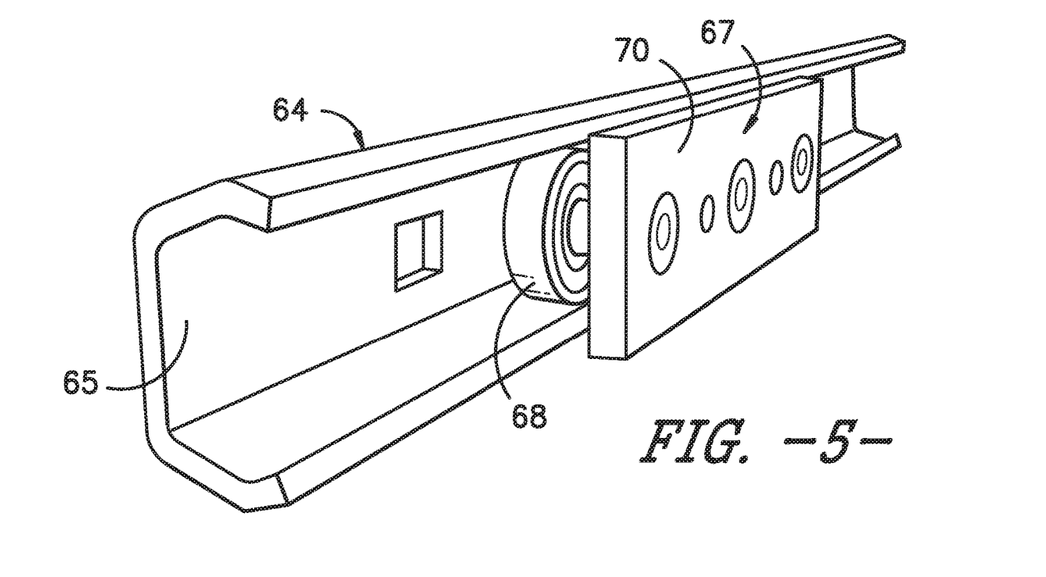
FIG. 5 illustrates a perspective view of one embodiment of a support component of the rail system of the present disclosure, particularly illustrating a rolling element configured within the track thereof.

In another embodiment, as shown particularly in FIG. 5, each of the parallel support arms 64 may include a rail track 65 or slot. More specifically, as shown, the rail track 65 of each support arm 64 may be configured the entire length of the arm 64 or only a portion thereof. In such embodiments, each of the sliding components 66 may also include at least one rolling element 67 configured within each track 65 so as to slide thereon. For example, as shown in FIG. 5, the rolling element 67 may include one or more roller bearings 68 configured to slide within the track 65. In addition, as shown, the rolling element 67 may include an attachment location 70, e.g. for at least one strap 72 to be connected between each rolling element 67 and the main shaft 34. In additional embodiments, as shown in FIGS. 4 and 6-8, the straps 72 of the sliding components 66 may be configured circumferentially around the main shaft 34. Alternatively, the straps 72 may be secured to a side location of the main shaft 34. It should be understood that the straps 72 may include any suitable strap, sling, holster, chain, or similar, or combinations thereof. For example, the straps 72 of the illustrated embodiment include a chain 73 connected to each attachment location 70 of the rolling elements 37 with a sling-type strap 72 connected between the chains 72 such that the strap 72 extends circumferentially around the main shaft 34.

In further embodiments, as shown in FIGS. 7 and 8, the parallel support arms 64 may be further supported, e.g. by securing at least one rod component 74 perpendicularly between the parallel support arms 64. More specifically, the rod component 78 may be mounted to each of the parallel support arms 64 so as to create an I-beam configuration that is configured to support the weight of the main shaft 34.

In another embodiment, as shown in FIGS. 4-8, the rail system 60 may also include at least one structural support 76 configured with each of the parallel support arms 64. Further, in such embodiments, the structural supports 76 may be secured to the bedplate 48 of the wind turbine 10, e.g. via one or more fasteners 75. Thus, the structural supports 76 provide further support to the rail system 60 as the main shaft 34 is being removed and/or replaced.

In yet another embodiment, the rail system 60 may also include a push/pull component 78 configured to push or pull the main shaft 34 during removal or installation thereof. For example, as shown in FIGS. 4 and 7, the push component 78 may be mounted to a bearing housing 56 of the main shaft 34. More specifically, as shown, the push component 78 may have parallel rods 80 with a push/pull rod 82 configured perpendicularly therebetween. Thus, the parallel rods 80 may be mounted to the bearing housing 56 and the push rod 82 can slid along the parallel rods 80 so as to assist with movement of the main shaft 34. More specifically, as shown in FIGS. 4 and 7, the push rod 82 is configured to apply a force to the aft end 39 of the shaft 34 so as to push the shaft 34 out of the bearing housing 56. Similarly, during installation, the push rod 82 can be used as a pull rod 82 such that it pulls the shaft 34 into the bearing housing 56.

Figure 9:
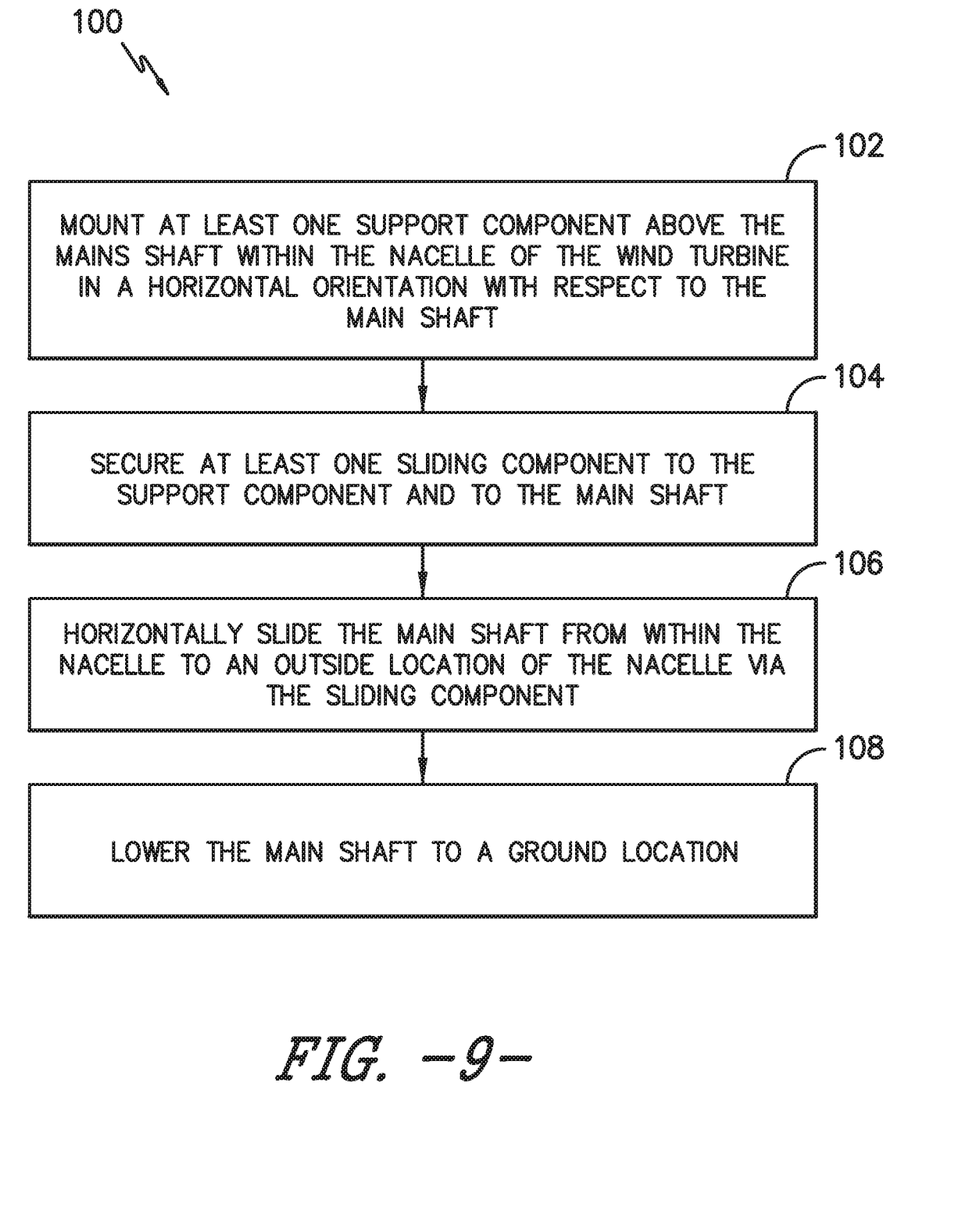
FIG. 9 illustrates a flow diagram of a method for removing a main shaft of a drivetrain assembly of a wind turbine from a nacelle installed atop a wind turbine tower according to the present disclosure.

Referring now to FIG. 9, a flow diagram of one embodiment of a method 100 for removing the main shaft 34 of the drivetrain assembly 30 of the wind turbine 10 from the nacelle 16 installed atop the tower 12 is illustrated. As shown at 102, the method 100 includes mounting at least one support component 62 above the main shaft 34 within the nacelle 16 of the wind turbine 10 in a horizontal orientation with respect to the main shaft 34. More specifically, in certain embodiments, the step of mounting the support component(s) 62 above the main shaft 34 within the nacelle 16 in the horizontal orientation with respect to the main shaft 34 may include securing parallel support arms 64 horizontally with respect to the main shaft 34.

As shown at 104, the method 100 includes securing at least one sliding component 66 to the support component 62 and to the main shaft 34. In addition, as mentioned, each of the parallel support arms 64 may include a rail track 65. Thus, in such embodiments, the step of securing at least one sliding component 66 between the support component 62 and to the main shaft 34 may include securing a rolling element 67 within each of the tracks 65 of the parallel support arms 64, and securing a strap 72 to each rolling element 67 and circumferentially around the main shaft 34.

In another embodiment, the method 100 may include securing at least one rod component 74 perpendicularly between the parallel support arms 64. Further, in additional embodiments, the method 100 may include anchoring the parallel support arms to the nacelle 16. More specifically, the method 100 may include securing a structural support 76 between each of the parallel support arms 64 and the bedplate 48 of the wind turbine 10 via one or more fasteners 75 so as to further support the support arms 64 during removal of the main shaft 34. In further embodiments, the method 100 may also include mounting a push component 78 to the bearing housing 56 of the main shaft 34. Thus, as mentioned, the push component 78 is configured to push or pull the main shaft 34 during removal or installation thereof.

Referring still to FIG. 9, as shown at 106, the method 100 includes horizontally sliding the main shaft 34 from within the nacelle 16 to an outside location of the nacelle 16 via the sliding component 66 (FIG. 6). Further, as shown at 108, the method 100 also includes lowering the main shaft 34 to a ground location. For example, in certain embodiments, the method 100 may include lowering the main shaft 34 to the ground location via a crane.

Figure 10:
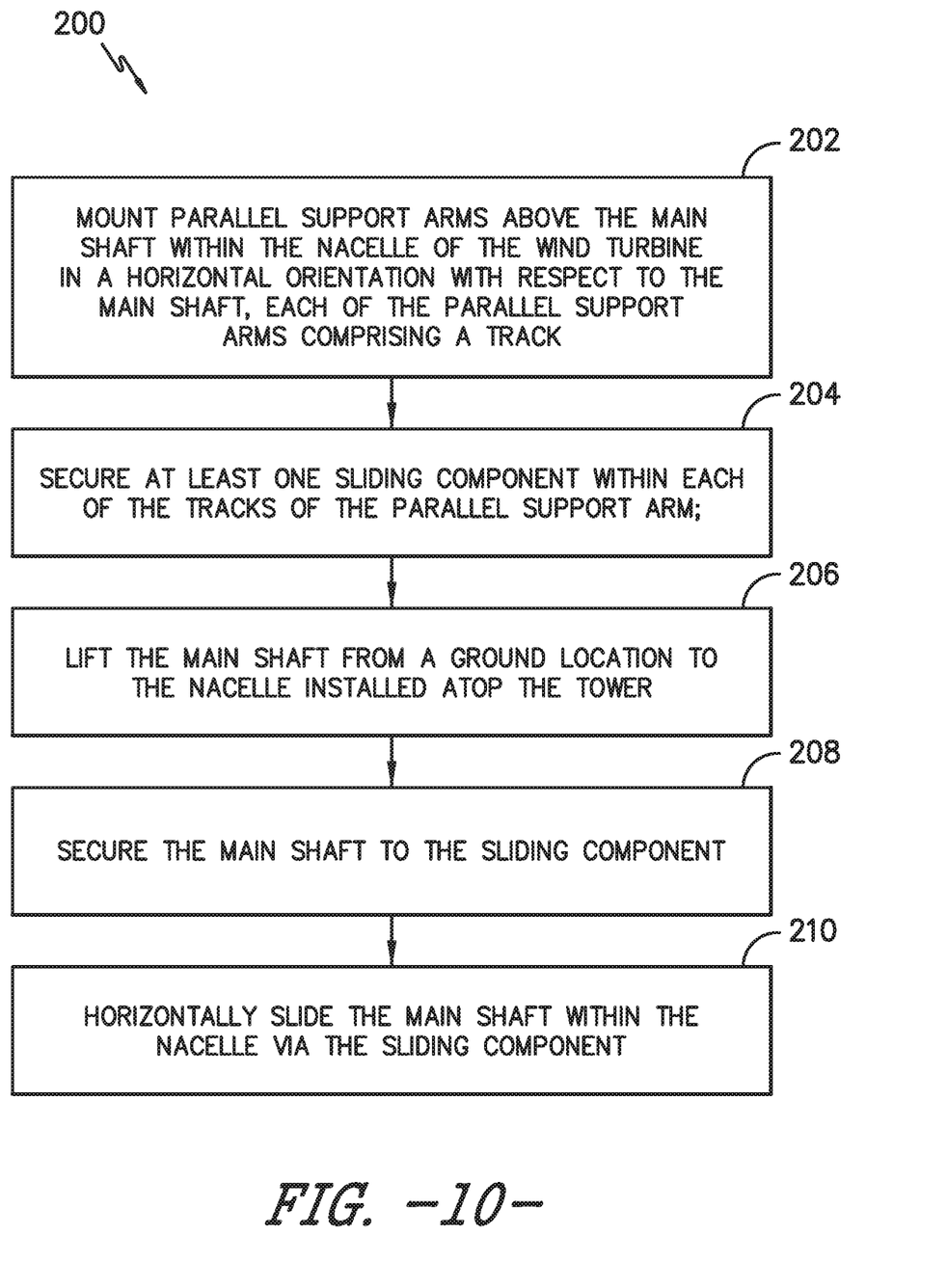
FIG. 10 illustrates a flow diagram of a method for installing a main shaft of a drivetrain assembly of a wind turbine within a nacelle installed atop a wind turbine tower according to the present disclosure.

Referring now to FIG. 10, a flow diagram of one embodiment of a method 200 for installing the main shaft 34 of the drivetrain assembly 30 of the wind turbine 10 within the nacelle 16 installed atop the tower 12 is illustrated. As shown at 202, the method 200 includes mounting parallel support arms 64 above the main shaft 34 within the nacelle 16 of the wind turbine 10 in a horizontal orientation with respect to the main shaft 34, wherein each of the parallel support arms 64 has a track 65. As shown at 204, the method 200 includes securing at least one sliding component 66 within each of the tracks 65 of the parallel support arms 64. As shown at 206, the method 200 includes lifting the main shaft 34 from a ground location to the nacelle 16 installed atop the tower 12. As shown at 208, the method 200 includes securing the main shaft 34 to the sliding component 66. As shown at 210, the method 200 includes horizontally sliding the main shaft 34 within the nacelle 16 via the sliding component 66.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rail system for removing or installing a main shaft of a drivetrain assembly of a wind turbine to and from a nacelle installed atop a wind turbine tower with a rotor of the wind turbine remove a reveal a front opening of the nacelle, the rail system comprising:
   a plurality of parallel support arms mounted above the main shaft for supporting the main shaft within the nacelle, the plurality of parallel support arms extending through and beyond the front opening of the nacelle where the rotor has been removed, the plurality of parallel support arms each defining a longitudinal axis extending parallel with respect to a longitudinal axis of the main shaft, each of the parallel support arms comprising a track; and, a sliding component arranged within each track of each of the plurality of parallel support arms, wherein the sliding components move horizontally along its respective track so as to slide the main shaft between an installed position within the nacelle and an uninstalled position outside of the nacelle.

2. The rail system of claim 1, wherein each of the sliding components comprises at least one rolling element arranged within each track.

3. The rail system of claim 2, further comprising at least one strap connected between opposing rolling elements of the plurality of parallel support arms and wrapped around the main shaft.

4. The rail system of claim 3, wherein the straps are arranged circumferentially around the main shaft.

5. The rail system of claim 1, further comprising a structural support arranged with each of the parallel support arms.

6. The rail system of claim 5, wherein the structural supports are secured to a bedplate of the wind turbine via one or more fasteners.

7. The rail system of claim 1, further comprising a push component positioned to push or pull the main shaft during removal or installation thereof.

8. The rail system of claim 7, wherein the push component is mounted to an aft end of a bearing housing of the main shaft.

9. The rail system of claim 1, wherein the plurality of parallel support arms are secured to each other via at least one rod component arranged perpendicularly with the parallel support arms.

* * * * *